United States Patent [19]

Haselbauer et al.

[11] Patent Number: 4,729,218
[45] Date of Patent: Mar. 8, 1988

[54] GAS TURBINE ENGINE WITH GENERATOR ARRANGEMENT

[75] Inventors: Franz Haselbauer, Muenzenberg; Thomas Weber, Oberursel, both of Fed. Rep. of Germany

[73] Assignee: Kloeckner-Humboldt-Deutz AG, Fed. Rep. of Germany

[21] Appl. No.: 892,932

[22] Filed: Aug. 4, 1986

[30] Foreign Application Priority Data

Aug. 8, 1985 [DE] Fed. Rep. of Germany ....... 3528519

[51] Int. Cl.⁴ .............................................. F02C 7/00
[52] U.S. Cl. ...................................... 60/39.33; 60/734
[58] Field of Search ................... 60/39.281, 39.33, 734, 60/39.091, 39.142, 39.15

[56] References Cited

U.S. PATENT DOCUMENTS

| | | | |
|---|---|---|---|
| 2,720,256 | 10/1955 | Pearson | 60/39.281 |
| 3,696,612 | 10/1972 | Berman | 60/39.281 |
| 4,394,811 | 7/1983 | Swick | 60/39.281 |

Primary Examiner—Louis J. Casaregola
Attorney, Agent, or Firm—Charles L. Schwab

[57] ABSTRACT

A gas turbine engine with an electrically driven fuel pump unit wherein the rotor of the gas turbine engine operates an electric generator. The generator supplies two separate circuits. One circuit serves in the customary way to supply electricity for the flight system of an airplane or missile in which the gas turbine engine is used, while the second circuit is connected to an electrically driven fuel pump unit for the purpose of driving the latter. The circuit which is provided for the fuel pump unit can be at a higher electrical voltage than the circuit which is connected to the flight system. Mechanical gear units, which would otherwise be necessary, can be omitted; and the electrical conduit cross sections necessary for delivering energy are extremely small in cross section and of relative light weight which is advantageous in airplane and missile applications of the gas turbine engine.

14 Claims, 4 Drawing Figures

GAS TURBINE ENGINE WITH GENERATOR ARRANGEMENT

TECHNICAL FIELD

This invention relates to a gas turbine engine having a compressor, a combustion chamber, and a turbine, as well as a common rotor, in which the combustion chamber is supplied with fuel by a separate electrically powered fuel pump unit connected with an electrical generator arrangement driven by the rotor.

BACKGROUND OF THE INVENTION

Usually, gas turbine engines for powering airplanes or missiles consist, at the least, of a compressor, a combustion chamber, and a turbine. The auxiliary equipment which is necessary for operating the gas turbine engine and the airplane are customarily driven mechanically by the rotor of the gas turbine engine. The auxiliary equipment which is particularly essential in supplying power are the fuel pump, the lubricating pump and the generator arrangement. In order to operate the auxiliary equipment at the respective correct speed and to distribute the energy in suitable manner, it is customary for the rotor to initially drive a gear unit which is in turn connected to the individual auxiliary equipment. Altogether, a multitude of components and assemblies is necessary whereby the system weight of the entire unit, consisting of the gas turbine engine and the requisite auxiliary equipment, becomes disadvantageously high. A high system weight is especially disadvantageous in the field of application which involves using the gas turbine engine in airplanes because provisions must be made for providing extra power output during the flight for any additional weight. The fuel consumption thus increases in a disadvantageous way, or the range of operation of the airplane decreases. In addition to this, a high system weight negatively influences the flight properties because of high inertial forces.

OBJECTS AND BRIEF SUMMARY OF THE INVENTION

A main object of the invention is to provide a gas turbine engine with a low system weight.

In accordance with the invention, the rotor of the gas turbine engine is connected mechanically to the generator arrangement and drives it at the same speed. A weight-intensive and cost-intensive gear unit for the generator arrangement can thus be advantageously deleted. In addition, the fuel pump is provided with an electric motor for its operation. Thus, a relatively heavy mechanical gear unit for driving the fuel pump is also eliminated. By designing the gas turbine engine drive for the fuel pump without a gear unit, a considerable reduction in weight can be achieved. This reduction in weight is accomplished by conveying electrical energy to an electrically driven fuel pump unit by electrical leads. In addition, a multitude of components of the otherwise customary mechanical drive for the fuel pump are spared so that the fabrication and assembly of the gas turbine drive is simpler and more cost efficient. Because of the low number of components, maintaining the equipment is particularly economical.

In this invention, the generator arrangement is provided with at least two circuits which are completely independent of each other, whereby one of the circuits is provided and laid out especially for supplying electrical energy for the fuel pump unit. The second circuit serves to provide a completely independent supply of electricity for the customary flight system of an airplane, or is provided only for the control function of the gas turbine engine. Compared to the other auxiliary equipment of the gas turbine engine or, as the case may be, the airplane, the electrical fuel pump unit requires the greatest amount of energy. One feature of this invention is that the somewhat heavier electrical components required for supplying energy to the fuel pump unit are only required in the separate circuit for the fuel pump unit. Altogether, therefore, the system weight of the gas turbine engine, with the electrically driven fuel pump unit and the two separate electrical circuits, remains advantageously low.

In the preferred embodiment of the invention, the generator arrangement is connected to the rotor of the gas turbine engine and supplies all the power for all auxiliary and control equipment for the gas turbine engine. In this way, no additional gearing such as angle gears or power takeoff shafts is required. The overall design of the gas turbine engine is advantageously simple, whereby manufacture and maintenance of the gas turbine engine is extraordinarily economical. All of the auxiliary equipment is driven electrically without exception, thereby making it easy to match power requirements of the auxiliary equipment, through the correct choice of electrical power voltages. This invention permits a modular series of gas turbine engines to be offered with varying performances through optimally selected auxiliary equipment.

Another advantage in this invention lies in the fact that it is possible to connect subsequently added electrically driven auxiliary equipment to the gas turbine engine without having to alter the construction of the gas turbine engine in the process. The gas turbine engine of this invention represents a completely self-contained power unit which can be easily incorporated into a wide variety of installations. Because of the deletion of all gear arrangements and power takeoff shafts, the overall system weight can be maintained at the extremely low level required in an airplane.

In one version of the invention, the two circuits supply electricity at different electrical voltages, whereby the voltage of the circuit which supplies the fuel pump unit is significantly greater than the voltage of the other circuit. With this advantageous design, the fuel pump unit is thus supplied by a high voltage, while the second circuit supplies the flight system with the customary low voltage, such as, for example, 28 volts. In spite of the high power requirement for the fuel pump unit, the current level of the circuit which supplies the fuel pump is kept advantageously low by the use of a high voltage for the circuit. This invention also permits the required fuel pump delivery control to be provided in a manner adding very little weight. All electric lines of the circuit in this invention can be provided with small cross sections in a weight conserving, cost efficient, and material saving manner. The total weight of the gas turbine engine unit is thus particularly low.

In application of the invention, an electrical voltage of 260 volts has proved suitable for the fuel pump circuit. This electrical voltage level represents a good compromise between the requirement for low electrical currents during high output and the requirement for voltages which are not too high, since the expense required for insulation can otherwise increase considerably. In special applications, the voltage of the fuel pump circuit can, however, deviate in an advantageous manner above or below this value, to a greater or lesser extent.

The generator arrangement which is powered by the gas turbine engine may be a single generator which has two separate windings for the two separate circuits. As an alternative to this, the generator arrangement can be two completely separate individual generators which are powered in parallel by the gas turbine engine. In the former case, there are advantages in terms of weight because of the low number of components, while in the latter case the controllability of the two circuits presents an advantage. With the two-generator concept, it is also possible to use optimally matched generators for the respective intended applications of the circuits.

By using two separate circuits, the delivery of the electrically driven fuel pump unit can be regulated by varying the electrical output of the circuit supplying power to the electrically driven fuel pump unit. Thus, the fuel pump circuit is regulated to control fuel delivery while the separate circuit for the flight system is kept at as constant a voltage as is possible. The regulation of power delivered by the circuit to the electrically driven fuel pump unit can be achieved by varying the voltage, whereby the voltage of the circuit is raised or lowered to raise or lower the fuel pump output.

In one embodiment of the invention, the output of the circuit for the fuel pump unit is regulated by means of a separate electrical output setting mechanism. This output setting mechanism can be coupled in a well known manner with an electrical regulator so as to control the output of the fuel pump subject to varying operating parameters. In addition, it is possible in an advantageous manner to control the electrical output of the circuit which supplies the fuel pump unit, in case it is supplied by a separate generator, by means of a regulator built into the generator. Thus, it is possible to avoid additional components in a simple manner and to control the output of the fuel pump directly with an electrical regulator in the generator. This has a particularly beneficial effect on the weight for the entire system of the gas turbine engine including all auxiliary equipment.

In another embodiment of the invention, the generator arrangement for the circuit of the fuel pump unit delivers a multiphase alternating current, specifically a three-phase current. Delivery of power from the generator arrangement to the fuel pump unit thus requires three separate electrical cables, which can be of small cross section. In addition, the output of the fuel pump can, advantageously, be controlled not through a voltage regulator but rather through frequency modulation of the three-phase current.

It may be advantageous to install a rectifier in the circuit for the fuel pump unit so that the electric motor of the fuel pump unit is operated with direct current. Thus, only two electrical conductors are necessary whereby, assuming there are relatively narrow fuel pump output band widths, a weight advantage develops vis-a-vis a triple core conductor design for three-phase current. In addition to this, it is also possible in many use applications to provide only one lead wire and to accomplish feedback or grounding via the connected metal components of the gas turbine engine or, as the case may be, the aircraft and the auxiliary equipment.

In one embodiment of the invention, all the auxiliary equipment for the gas turbine engine is connected to the circuit of the generator arrangement designed for transmitting large quantities of energy, such as in a gas turbine engine, with additional electrically driven auxiliary equipment requiring a greater energy supply for its operation. Such an arrangement is advantageous where extremely high power outputs are demanded by auxiliary equipment, such as, for example, an electrically driven hydraulic pump. Thus, the one circuit for electric energy transmission is laid out optimally with a relatively high electrical voltage, while the second circuit with a relatively low voltage guarantees the customary power supply to the flight system.

In special use applications of the gas turbine engine in which some of the electrically driven auxiliary equipment must deliver outputs similar to the power output of the fuel pump, it may be desirable to provide a separate third circuit of the generator arrangement for this performance intensive auxiliary equipment. Use of a third circuit permits the auxiliary equipment connected thereto to be provided with electricity matching its requirements and regulatory needs.

This invention through use of electric circuits not only saves considerable weight as compared to various mechanical drive arrangments, but also affords greater regulation of output and improved performance of the gas turbine engine and the aircraft in which used.

BRIEF DESCRIPTION OF THE DRAWINGS

Other characteristics and advantages of the invention will become apparent upon reference to the following description and the drawings, in which.

DETAILED DESCRIPTION OF THE DRAWINGS

Figure 1:
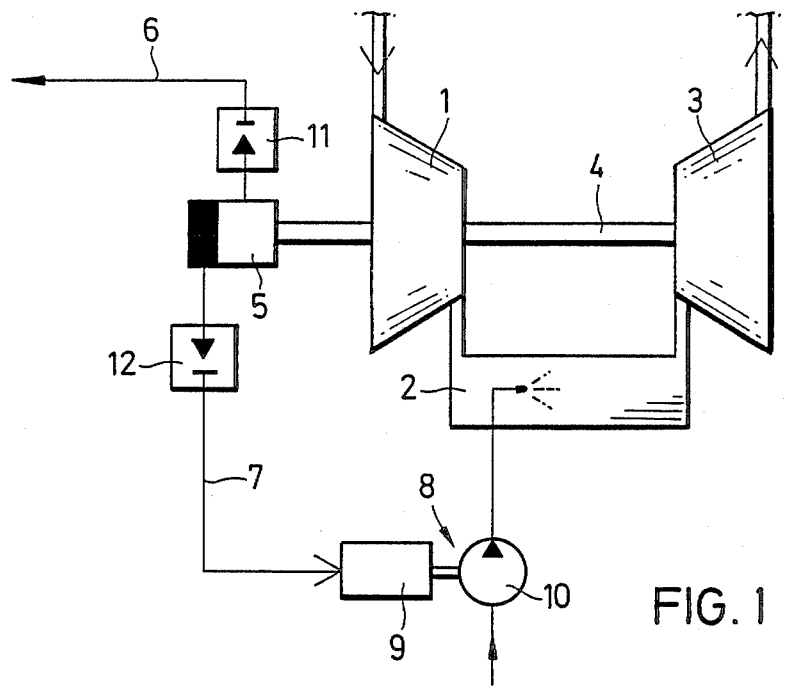
FIG. 1 is a schematic representation of a gas turbine engine incorporating one embodiment of the invention with a generator arrangement consisting of a generator with two separate circuits.

The gas turbine engine represented in FIGS. 1 through 4 consists of a compressor 1, a combustion chamber 2, a turbine 3, and a rotor 4. The rotor 4 drives an electric generator arrangement 5, 5A, 5B or 5C directly. The generator arrangement is disposed on the end of the rotor 4 extending beyond the outboard side of the compressor 1. For many use applications it may be suitable to arrange the generator 5 on the rotor 4 between the compressor 1 and the turbine 3. In each of the illustrated embodiments, the generator arrangement has two circuits, one of which is connected to an electrically driven fuel pump unit 8 so as to supply electrical energy to it. The fuel pump unit 8 consists of an electric motor 9 and a mechanical pump 10. The mechanical pump 10 delivers the fuel from a tank, which is not shown, to the combustion chamber 2 where it is burned and ultimately supplies the entire energy for the gas turbine engine. A second circuit 6 is provided for control purposes such as the flight system of the airplane or missile in which the gas turbine engine has been installed. This circuit 6 is most often a direct current circuit which is regulated at a constant voltage such as, for example, 28 volts by an electrical voltage regulator 11.

In the case of the gas turbine engine represented in FIG. 1, the generator arrangement 5 uses a single generator for circuits 6 and 7, which are separated from each other, with circuit 7 being connected to the fuel pump unit 8. The single generator has two separate windings whereby one winding is connected by way of a rectifier and voltage regulator 11 with circuit 6, and the second winding is connected by way of a rectifier 12 to the second circuit 7 which connects to the electric motor 9 of the fuel pump unit 8. The electrical output of circuit 7 is not regulated. The amount of fuel which is forwarded from the mechanical pump 10 can, however, be regulated by a mechanical control in the pump. The voltage in the circuit 7 which supplies the fuel pump unit 8 is substantially higher than the voltage in the circuit 6 supplying electricity for the flight system. Specifically, the voltage in circuit 7 may be 260 volts.

Figure 2:
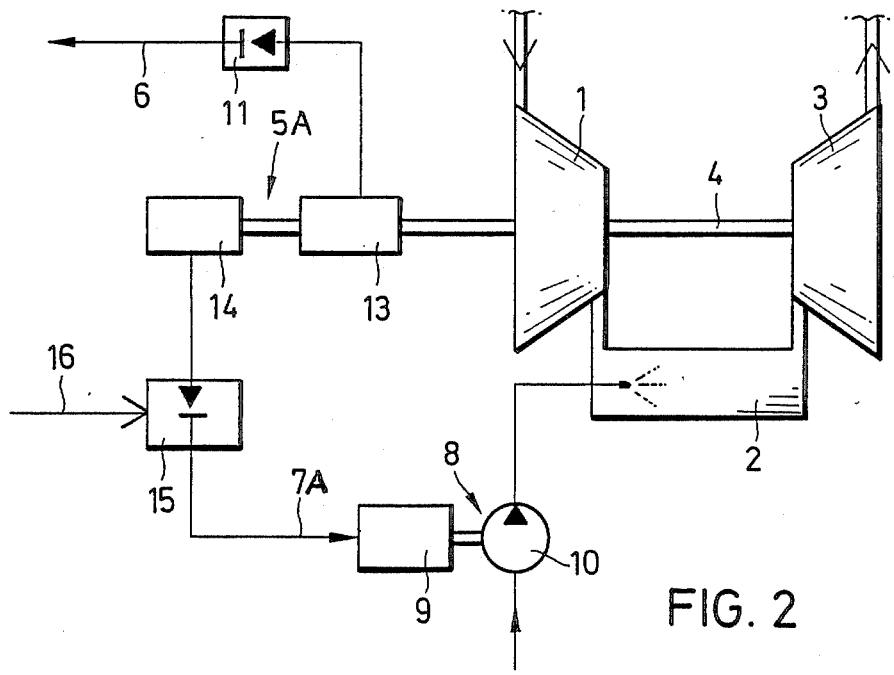
FIG. 2 is a schematic representation of a second embodiment of the invention having two individual generators and an electrical output setting mechanism.

The gas turbine engine shown in FIG. 2 is, with the exception of the generator arrangement 5A, similar to that shown in FIG. 1. The generator arrangement 5A consists of two independent electric generators 13 and 14. The independent generators 13, 14 are each driven by the rotor 4 and can be arranged at an axial elongation of the rotor at the compressor end of the gas turbine engine as well as on the rotor 4 between the compressor 1 and the turbine 3. The generator 13 supplies circuit 6 for a flight system in the customary manner. The output of the generator 14 is connected by the circuit 7A in electric energy supplying relation to the fuel pump unit 8. The generator 14 supplies the electrical energy with high voltage and in an unregulated manner to control means in the form of an electrical output regulator 15, which determines the electrical output delivered to the electrical motor 9 of fuel pump unit 8 in response to an output setting mechanism providing an externally generated signal via control circuit 16 which signal may be in the form of a variable control voltage or a variable control current. The control voltage or control current signal is produced by an output setting mechanism which is responsive to several operating parameters of the gas turbine engine or the missile in which the gas turbine engine has been installed. The magnitude of the signal, namely the magnitude of the control voltage or the control current, determines the quantity of fuel which is delivered to the gas turbine engine. The generator 14 can be designed to make advantageous use of permanent magnets. It may also be advantageous to design the electric motor 9 as a direct current motor.

In the embodiment shown in FIG. 2, the circuit 7A is especially efficient in transmitting a relatively large amount of energy or power. Generator 14 makes it possible, because of its high voltage of, for example, 260 volts, to keep the cross sections of the power transmission lines or conduits to the electrical motor 9 relatively small, thereby reducing the weight of the whole system consisting of the gas turbine engine, generator arrangement 5A, and fuel pump unit 8 as well as all necessary controls and accessories. In addition to this, the fuel which is delivered to the combustion chamber 2 by the mechanical pump 10 is already regulated in terms of quantity without any supplementary equipment.

Figure 3:
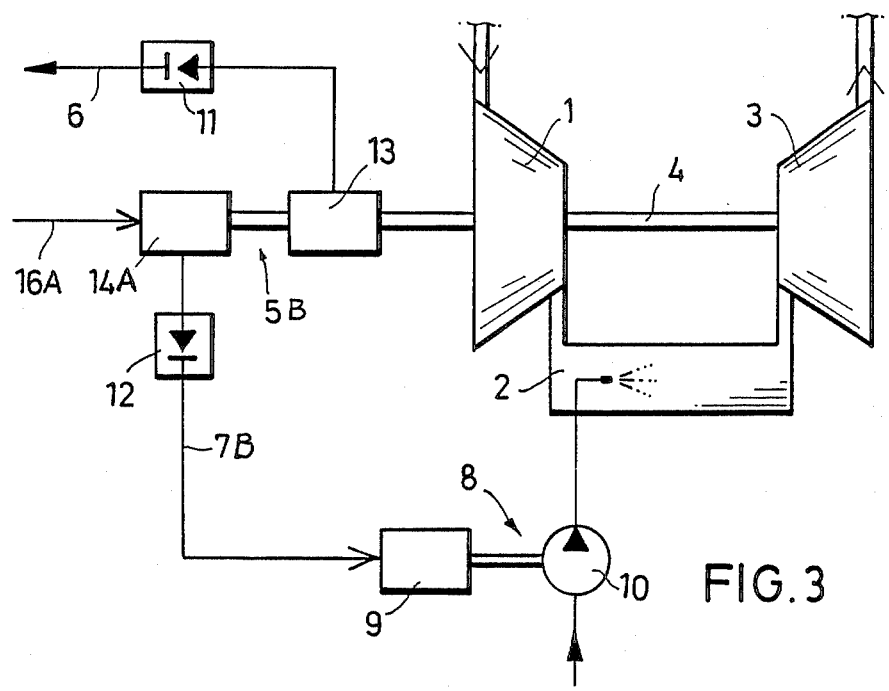
FIG. 3 is a schematic representation of a third embodiment of the invention in which one of two electric generators is directly regulated.

In the embodiment shown in FIG. 3, the generator arrangement 5B is also provided with two individual generators 13, 14A and is generally similar to the embodiment of FIG. 2. However, an electrical voltage control 16A of an output setting mechanism is connected directly to the generator 14A. A change in the voltage control 16A causes a corresponding change in the voltage applied to circuit 7B. Circuit 7B for the fuel pump unit is, in addition, also provided with a rectifier 12, which rectifies the regulated alternating current of generator 14A. The regulation provided by the voltage control 16A is generally the same as that provided for the system shown in FIG. 2.

Figure 4:
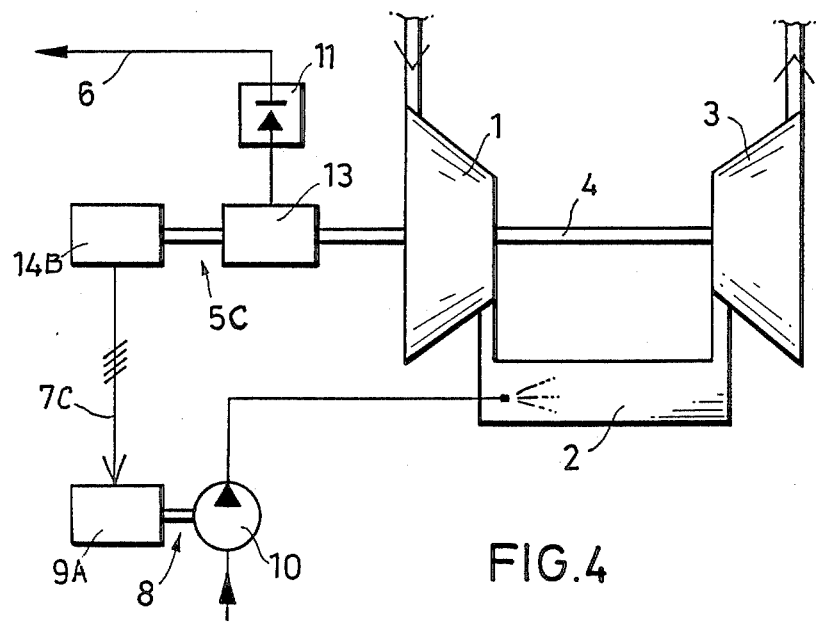
FIG. 4 is a schematic representation of a fourth embodiment of the invention in which one of two electric generators delivers three-phase current.

FIG. 4 shows an additional embodiment of the invention wherein a generator arrangement 5C includes two individual generators 13 and 14B with the generator 14B connected to circuit 7C so as to drive the fuel pump unit 8. The generator 14B produces a multiphase alternating current, such as three-phase current, for supplying an electrical motor 9A driving the fuel pump unit 8. Circuit 7C is not output regulated in this embodiment of the invention which makes it necessary to use a separate control, such as a mechanical control, to regulate the quantity of fuel delivered by the mechanical pump 10. The generator 14B delivers multiphase alternating current to the electrical motor 9A by way of electrical leads which have small cross sections and are therefore weight saving, as compared to other means of power transmission. Generator 14B is thus advantageously a permanent magnet generator and the electrical motor 9A for fuel pump unit 8 is an asynchronous motor. It is also expedient, however, to design the generator 14B in such a way that the frequency of the three-phase current in circuit 7C is modulated so as to regulate the output of fuel pump unit 8. The motor 9A for the fuel pump unit 8 can, then, also be designed as an asynchronous motor. Additional mechanical controls for output regulation of the fuel pump unit 8 would therefore be unnecessary.

In a variation of the invention, an additional generator, not shown, can also be connected to the rotor 4 to supply electricity for additional electrical devices or electrical auxiliary equipment of the gas turbine engine or missile which require an above average electrical output. In this way, the flight system circuit is only involved in supplying minor electrical users of the control function while the electrical devices which have greater electrical demands are supplied by separate circuits with specially adapted voltages and, possibly, regulated transmission of energy. The various separate circuits can also be supplied, in an advantageous way and depending on the specific use application, by a single generator arrangement with various separate windings. Altogether, a reduction in weight is achieved throughout the entire system because of smaller conduit cross sections in the electrical transmission lines made possible by the system of circuits which are separated from each other and which carry different voltages. It is also advantageous to connect all output intensive devices to one circuit and the low power devices to another circuit.

The embodiments of the invention in which an exclusive property or privilege is claimed are defined as follows:

1. A gas turbine engine having a compressor, a combustion chamber, a turbine, common rotor for the compressor and the turbine and a separate electrically driven fuel pump unit supplying fuel to the combustion chamber, an electrical generator arrangement supplying electricity to drive the fuel pump unit including electric generator means mechanically and coaxially connected to and mounted on said rotor so as to be driven directly by said rotor and at least two independent electric output circuits connected to said generator means, one of said circuits being connected in electrical energy supplying relation to said electrically driven fuel pump unit and the other of said circuits being connected to auxiliary equipment of said gas turbine engine other than said fuel pump unit, said generator means supplying electricity to said two independent cicuits at different electrical voltages, respectively, with the voltage of said one electrical circuit being significantly higher than the voltage of the other circuit.

2. The gas turbine engine of claim 1 wherein the voltage of said one circuit is approximately 260 volts.

3. The gas turbine engine of claim 1 wherein said generator means is a single generator having a separate winding for each circuit.

4. The gas turbine engine of claim 1 wherein said generator means comprises two separaate generators supplying electricity, respectively, to said two circuits.

5. The gas turbine engine of claim 1 wherein said one circuit includes a voltage regulator.

6. The gas turbine engine of claim 1 wherein said generator means supplies multiphase alternating current to said one circuit.

7. The gas turbine engine of claim 1 wherein said one circuit includes a rectifier operative to supply said electrically driven fuel pump unit with direct current.

8. The gas turbine engine of claim 7 wherein said generator means comprises two separate generators supplying electricity to said two circuits, respectively.

9. The gas turbine engine of claim 8 wherein said generator arrangement includes electric control means operatively associated with said one circuit for regulating the output of the latter thereby controlling the output of said fuel pump unit.

10. A gas turbine engine having a compressor, a combustion chamber, a turbine, a common rotor for the compressor and the turbine and a separate electrically driven fuel pump unit supplying fuel to the combustion chamber, an electrical generator arrangement supplying electricity to drive the fuel pump unit including electric generator means mounted on and driven directly by said rotor and at least two independent electric output circuits connected to said generator means, one of said circuits being connected in electrical energy supplying relation to said electrically driven fuel pump unit and the other of said circuits being connected to auxiliary equipment of said gas turbine engine other than said fuel pump unit, said generator means supplying greater electrical energy to said one circuit than to the other circuit.

11. The gas turbine of claim 10 wherein said generator means is mechanically and coaxially connected to said rotor.

12. The gas turbine engine of claim 11 wherein said generator means is a single generator having separate windings for each circuit.

13. The gas turbine engine of claim 12 wherein said generator means comprises two separate genertors supplying electricity, respectively, to said two circuits.

14. A gas turbine engine having a compressor, a combustion chamber, a turbine, a common rotor for the compressor and the turbine and a separate electrically driven fuel pump unit supplying fuel to the combustion chamber, an electrical generator arrangement supplying electrically to drive the fuel pump unit including electric generator means mounted on and driven directly by said rotor and at least two independent electric output circuits connected to said generator means, one of said circuits being connected in electrical energy supplying relation to said electrically driven fuel pump unit and the other of said circuits being connected to auxiliary equipment of said gas turbine engine other than said fuel pump unit, said generator means being a single genrator having a separate winding for each circuit.

* * * * *

UNITED STATES PATENT OFFICE
CERTIFICATE OF CORRECTION

Patent No. 4,729,218          Dated  March 8, 1988

Inventor(s)   Franz Haselbauer and Thomas Weber

It is certified that error appears in the above-identified patent and that said Letters Patent are hereby corrected as shown below:

Column 6, line 61, "a" should be inserted between "turbine," and "common";

Column 7, line 7, "cicuits" should read "circuits";

Column 7, line 17, "separaate" should read "separate";

Column 8, line 20, "genertors" should read "generators";

Column 8, line 35, "genrator" should read "generator".

Signed and Sealed this

Nineteenth Day of July, 1988

Attest:

DONALD J. QUIGG

Attesting Officer          Commissioner of Patents and Trademarks